No. 776,556. PATENTED DEC. 6, 1904.
C. C. SIBLEY & G. A. LUTZ.
CONDUIT FOR ELECTRIC WIRES.
APPLICATION FILED DEC. 19, 1902.
NO MODEL.
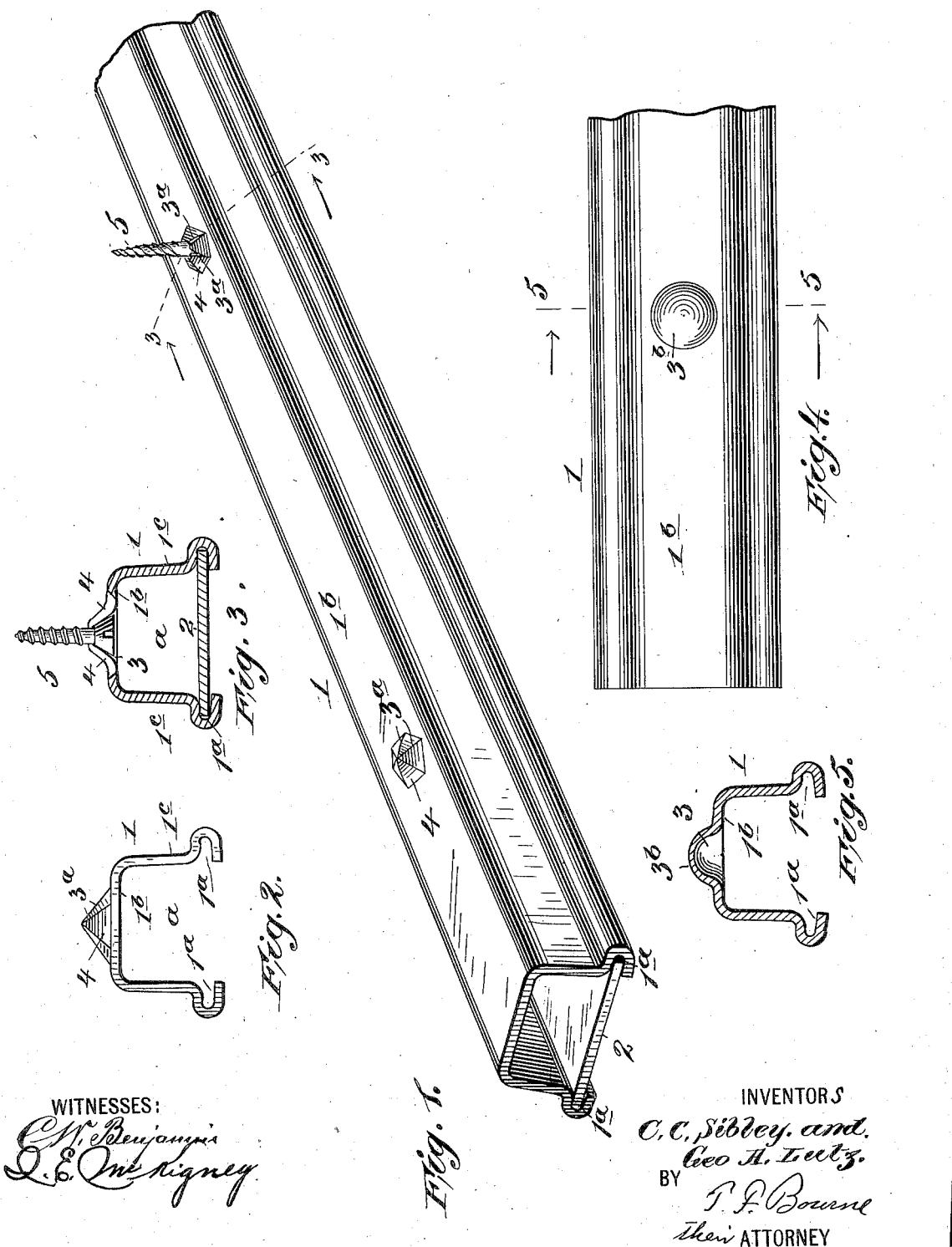

No. 776,556.

Patented December 6, 1904.

UNITED STATES PATENT OFFICE.

CLARENCE C. SIBLEY, OF PERTH AMBOY, NEW JERSEY, AND GEORGE A. LUTZ, OF NEW YORK, N. Y.

CONDUIT FOR ELECTRIC WIRES.

SPECIFICATION forming part of Letters Patent No. 776,556, dated December 6, 1904.

Application filed December 19, 1902. Serial No. 135,857. (No model.)

*To all whom it may concern:*

Be it known that we, CLARENCE C. SIBLEY, a resident of Perth Amboy, Middlesex county, New Jersey, and GEORGE A. LUTZ, a resident of New York city, borough of Brooklyn, New York, citizens of the United States, have invented certain new and useful Improvements in Conduits for Electric Wires, of which the following is a specification.

The object of this invention is to provide means for securing metallic conduits or ducts to walls, ceilings, and other supports by means of screws, nails, or the like, whereby the heads thereof may be set back from the plane of the surface of the inner wall of the conduit to prevent injury to insulated electric wires contained therein or while being drawn therethrough. To these ends we provide a wall of a metallic conduit with countersunk portions or chambered extensions the walls of which are weakened to permit the passage of screws or nails therethrough and to enable the heads of the screws or nails to lie therein, the arrangement being such that those countersunk portions or extensions of the conduit through which the screws or nails are not passed may remain closed practically tight, so that the conduit will not at such places be open.

The invention also contemplates the novel details of improvement that will be more fully hereinafter set forth and then pointed out in the claims.

Reference is to be had to the accompanying drawings, forming part hereof, wherein—

Figure 1 is a perspective view of a portion of a conduit embodying our invention. Fig. 2 is an end view thereof looking from the left in Fig. 1. Fig. 3 is a cross-section on the line 3 3 in Fig. 1. Fig. 4 is a detail view showing a modified form of the countersunk portion or chambered extension of the conduit, and Fig. 5 is a cross-section on the line 5 5 in Fig. 4.

Similar characters of reference indicate corresponding parts in the several views.

The conduit 1 shown in the accompanying drawings is of the class having a channel or groove $a$ to receive one or more wires and which may be made from a strip of sheet metal bent or rolled into the desired form to provide back wall $1^b$ and sides $1^c$, having grooves $1^a$ at the edges to receive a removable cover 2, (which may be of pliable metal,) whereby the cover may be held in position upon the conduit. One wall of the conduit, as the wall $1^b$ opposite the cover 2, which is to be placed against a ceiling, wall, or other support, is provided with a series of countersunk portions or chambered or hollow extensions 3 at suitable distances apart and extending beyond the outer face of the wall $1^b$ to receive the head of a screw or nail 5, so that such head may be set off from the inner face of wall $1^b$ to be out of line with a wire or wires within the conduit, as clearly shown in Fig. 3. The countersunk portions or extensions 3 of the conduit are provided with weakened walls or walls that are comparatively weaker than the metal of the main body of the conduit, and to this end in Figs. 1, 2, and 3 the extensions 3 are provided with slits $3^a$, which converge from the outer edges of the extensions to the apex or center thereof, forming tongues or prongs 4, shown of substantially triangular form, having their corresponding edges normally contiguous or in contact. In producing such arrangement suitable dies may be used, the first set of which will slit the extension on the lines $3^a$ and press outwardly some or all of the tongues 4, and then another set of dies may be used to press such tongues into such relative positions that their edges will closely and firmly abut, the metal of the tongues flowing toward the points if necessary to effect such result, as indicated in Fig. 3. The walls of the countersunk portions or extensions 3 thus formed by the tongues 4 will be substantially closed, as also the apex; but a screw, nail, or the like may be readily passed through the extension and between the ends of the tongues 4, spreading said tongues apart, the head of the screw or nail 5 being received in the countersunk or chambered extension 3, and by bearing against a support they will be kept from further spreading, and the conduit will be firmly held.

Instead of slitting the walls of the countersunk portions or extension 3 for permitting the passage of screws or nails said walls may be reduced in thickness by drawing dies or in any other well-known manner, so as to have the outer portion of the extensions at $3^b$ relatively thin compared to the main body of the conduit to permit the more ready passage of a nail or screw or a tool to start a hole therefor, as indicated in Figs. 4 and 5.

The conduit should preferably have a series of countersunk portions or extensions 3 located along the same at suitable distances apart to provide for securing the conduit in as many places as desired, according to the positions of the supporting parts adapted to receive the screws or nails, and the arrangement is such that if screws or rails are not passed through all of the extensions 3 they will remain closed practically tight, so that the conduit will not have openings or perforations unclosed at such points.

Having now described our invention, what we claim is—

1. A metallic conduit for electric wires having a wall provided with a series of countersunk extensions whose walls are slit providing tongues projecting toward a common point and arranged to permit the passage of screws or nails between their ends, whereby the heads of the screws or nails may bear upon said tongues and remain in the countersunk extensions, substantially as described.

2. A metallic conduit for electric wires having a wall provided with a series of countersunk extensions projecting outwardly whose walls are slit on lines converging to a common point providing substantially triangular-shaped tongues, said tongues being pressed together so that their adjacent edges engage firmly providing said countersunk extensions with weakened walls, the tongues being arranged to move outwardly to permit the passage of a screw or nail between their ends, substantially as described.

CLARENCE C. SIBLEY.
GEORGE A. LUTZ.

Witnesses:
H. B. BRADBURY,
T. F. BOURNE.